(No Model.)
L. P. KING.
PIPE UNION.
No. 565,411.  Patented Aug. 4, 1896.
Fig. I.
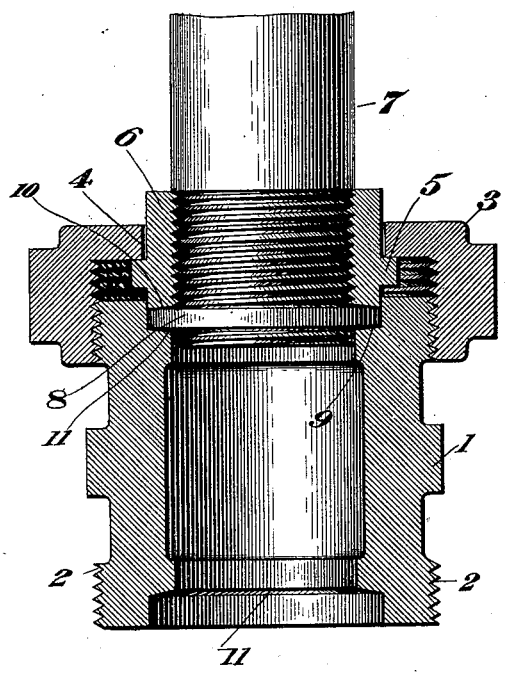
Fig. II.
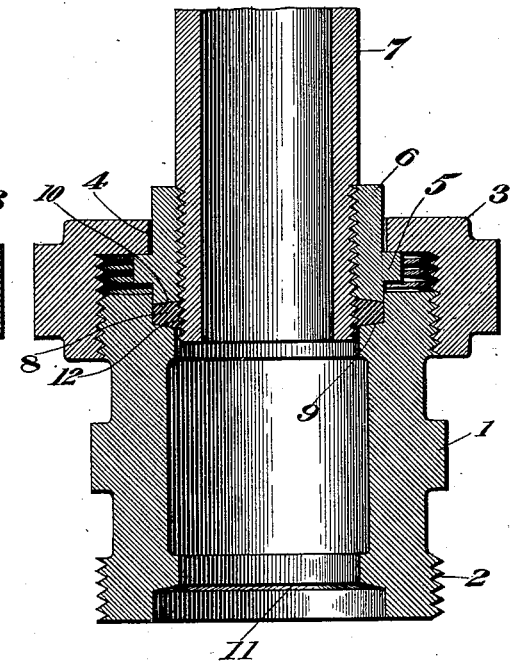
Fig. III.
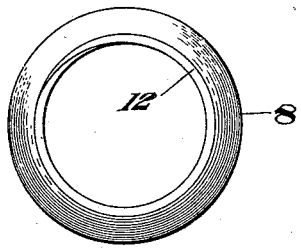
Witnesses
M. E. Fowler
S. N. Acker
Inventor
Leicester P. King
By Joseph L. Atkins
Attorney

UNITED STATES PATENT OFFICE.

LEICESTER P. KING, OF CINCINNATI, OHIO.

PIPE-UNION.

SPECIFICATION forming part of Letters Patent No. 565,411, dated August 4, 1896.

Application filed December 20, 1894. Serial No. 532,484. (No model.)

*To all whom it may concern:*

Be it known that I, LEICESTER P. KING, of Cincinnati, county of Hamilton, State of Ohio, have invented certain new and useful Improvements in Pipe-Unions, of which the following is a specification, reference being had to the accompanying drawings.

The object of my invention is to produce an improved pipe-union designed, by the employment of a special form of gasket, to make a perfect joint adapted to confine the most penetrating fluids, such, for example, as gaseous ammonia.

In the accompanying drawings, Figure I is a central longitudinal section of my union, the gasket being shown in elevation. Fig. II is a similar view with the gasket shown in cross-section and clearly illustrating the continuity of screw-threads through the compression-nut and the gasket. Fig. III is a view of a flat side of the gasket.

Referring to the figures on the drawings, 1 indicates a metallic joint provided on one or both ends with screw-threads 2, with which a screw-cap 3 engages. The screw-cap may be provided with an overhanging annular flange 4, that is designed to engage an annular web or flange 5 on the compression member or nut 6.

7 indicates a section of pipe that is screwed into the compression-nut, and 8 indicates a soft-metal gasket carried between the compression-nut and an annular seat 9 in the end of the joint. The abutting faces 10 and 11 of the compression-nut and annular seat 9, respectively, are preferably slightly dished, as illustrated.

In practice the pipe-section 7 is screwed entirely through the compression-nut until it protrudes into the joint, preferably a little beyond the seat 9.

The distinctive feature of my gasket consists in the presence of internal screw-threads 12, which fit the threads of the pipe with which a joint is to be made and form a regular continuation of the screw-threads of the compression-nut.

By the employment of a screw-threaded gasket an approximately close fit may be provided in the first instance between the parts which are to form the joint. Consequently a very slight degree of compression of the gasket will force the metal thereof into all the crevices of the joint and, without materially disturbing the relations of the parts, will produce a perfect joint.

I am aware that a compressible metallic gasket in a pipe-union, with mechanism for compressing it to form a joint, is not new. In such a device, however, although the initial compression of the gasket may tend to force the metal thereof into the screw-threads of the pipe which it is to fit, yet it does so obliquely and with such a distortion of the screw-threads formed by the initial compression in the gasket, compared with those which remain when the final compression is imparted to the metal, that the character of the joint is materially impaired in most instances and its use for all purposes cannot be relied upon.

I do not limit myself to the details of compressing mechanism employed for forming the joint, because they are susceptible of wide variations, and, in fact, do not form the substance of my invention, which is clearly defined in the following claims, to wit:

1. In a pipe-union, the combination with a joint having a concave annular seat, of a compressible annular gasket opposing the concave seat and having internal screw-threads and a smooth outer periphery, an internally-screw-threaded non-rotating compression member, and means for actuating the compression member to compress the gasket without rotating the pipe, compression member, or gasket, substantially as specified.

2. In a pipe-union, the combination with a joint having a concave annular seat, and external threads, of a compressible annular gasket opposing the concave seat and having internal screw-threads and a smooth outer periphery, an internally-screw-threaded compression member provided with an external annular flange and a screw-cap provided with an annular flange of less internal diameter than the external diameter of the annular flange upon the compression member and provided with internal screw-threads adapted to engage the threads upon the joint, whereby the compression member may be forced against the gasket to form a tight joint without rotating the pipe, compression member or gasket, substantially as specified.

3. In a pipe-union, the combination with a joint having a concave annular seat and external threads, of a compressible annular gasket opposing the concave seat and having internal screw-threads and a smooth outer periphery, an internally-screw-threaded compression member having a concave face and provided with an external annular flange, and a screw-cap provided with an annular flange of less internal diameter than the external diameter of the annular flange upon the compression member and provided with internal screw-threads adapted to engage the threads upon the joint whereby the compression member may be forced against the gasket to form a tight joint without rotating the pipe, compression member or gasket, substantially as specified.

4. In a pipe-union, the combination with a joint having a concave annular seat and external threads, of a compressible annular gasket convex upon its opposite sides opposing the concave seat and having internal screw-threads and a smooth outer periphery, an internally-screw-threaded compression member provided with an external flange and a screw-cap provided with an annular flange of less internal diameter than the external diameter of the annular flange upon the compression member and provided with internal screw-threads adapted to engage the threads upon the joints whereby the compression member may be forced against the gasket to form a tight joint without rotating the pipe, compression member or gasket, substantially as specified.

In testimony of all which I have hereunto subscribed my name.

LEICESTER P. KING.

Witnesses:
J. T. MILLS,
G. W. SWORMSTEDT.